United States Patent

Nagao

[11] Patent Number: 5,818,115
[45] Date of Patent: Oct. 6, 1998

[54] STARTING AND CHARGING APPARATUS

[75] Inventor: Yasuhiro Nagao, Okazaki, Japan

[73] Assignee: Nippondenso Co., Ltd., Kariya, Japan

[21] Appl. No.: 680,613

[22] Filed: Jul. 16, 1996

[30] Foreign Application Priority Data

| Jul. 17, 1995 | [JP] | Japan | 7-180384 |
| Jul. 17, 1995 | [JP] | Japan | 7-180386 |
| Jul. 2, 1996 | [JP] | Japan | 8-172642 |

[51] Int. Cl.[6] .......................... F02N 11/04; H02K 23/52
[52] U.S. Cl. ........................ 290/31; 290/7; 290/27; 290/38 R; 290/33; 180/65.1; 180/65.3; 180/65.4
[58] Field of Search ................ 290/38 R, 7; 123/179.1, 123/185.14, 185.1; 180/65.1, 65.3, 65.4; 320/15, 2

[56] References Cited

U.S. PATENT DOCUMENTS

| 4,896,637 | 1/1990 | Yamamoto | 123/179 |
| 5,119,010 | 6/1992 | Shirata et al. | 320/15 |
| 5,146,095 | 9/1992 | Tsuchiya et al. | 290/38 R |
| 5,155,373 | 10/1992 | Tsuchiya et al. | 290/38 R |
| 5,157,267 | 10/1992 | Shirata et al. | 290/38 R |
| 5,207,194 | 5/1993 | Clerici | 123/179.1 |
| 5,266,956 | 11/1993 | Tsuchiya et al. | 320/15 |
| 5,406,797 | 4/1995 | Kawamura | 60/608 |
| 5,498,951 | 3/1996 | Okamura et al. | 322/2 R |
| 5,563,454 | 10/1996 | Araki et al. | 307/10.6 |

FOREIGN PATENT DOCUMENTS

| 36-4310 | 7/1934 | Japan | 290/31 |
| 37-8316 | 7/1934 | Japan | 290/31 |
| 63-77438 | 5/1988 | Japan | 290/31 |
| 2-264154 | 10/1990 | Japan | 290/31 |
| 5-223042 | 8/1993 | Japan | 290/31 |
| 6-294369 | 10/1994 | Japan | 290/31 |
| 6-346747 | 12/1994 | Japan | 290/31 |

Primary Examiner—Steven L. Stephan
Assistant Examiner—Elvin G. Enad
Attorney, Agent, or Firm—Cushman Darby & Cushman IP Group of Pillsbury Madison & Sutro LLP

[57] ABSTRACT

A starter dynamo having a pinion engageable with a ring gear and an armature for rotating the pinion is supplied at engine starting with an electric storage power from an electric double layered capacitor used exclusively for the starter dynamo. With this storage power, the armature rotates and, with this armature rotation, the pinion rotates. An engine ring gear is driven through the pinion to start the engine. After the engine starting, the ring gear rotation is transmitted to the armature through the pinion and the starter dynamo charges the electric double-layered capacitor. Thus, an electric storage power required for the next engine starting is charged in a short period of time.

13 Claims, 10 Drawing Sheets

STARTING AND CHARGING APPARATUS

BACKGROUND OF THE INVENTION

1. Field of the Invention

The present invention relates to a starting and charging apparatus equipped with a rotary electric machine, i.e., starter dynamo, for starting and power generating.

2. Related Art

A capacitor-installed starting apparatus is known conventionally by JP-A 3-23370 in which a capacitor is charged by a storage battery through a current limiting resistor and, when a starter is driven to start an engine, the electric power stored in the capacitor is supplied to the starter through an on-off switch. According to this apparatus, since the capacitor which stores only the electric power required for driving the starter may be a small one and arranged integrally with the starter, a large-diameter electric lead wire connecting the starter and the capacitor can be made short and its electric power loss thereof can be reduced.

In this conventional apparatus, however, the capacitor which supplies the starter with the stored electric power is charged by the battery through the current limiting resistor. As a result, the charging current is small and it takes a long time to recharge the capacitor by the electric power amount discharged to start the engine. Further, the starter cannot be driven immediately at the time of restarting after the engine stalled for some reason after starting the engine once.

SUMMARY OF THE INVENTION

It is therefore an object of the present invention to provide a starting and charging apparatus which enables restarting of an engine in a short period of time.

According to the present invention, a starter dynamo has a pinion for engagement with a ring gear of an engine and an armature for rotation of the pinion. At the time of engine starting, an electric power stored in an electric storage device provided exclusively for the starter dynamo is supplied to rotate the armature, which in turn rotates the pinion. The ring gear of the engine is driven through the pinion and the engine is started. After engine starting, rotation of the ring gear is transmitted to the armature through the pinion. The starter dynamo thus charges the electric storage device so that the electric power required for the next engine starting is charged. That is, the starter dynamo performs both starting the engine and charging the electric storage device. In proportion to the speed reduction ratio between the pinion and the ring gear, the armature rotation speed becomes high to assure a sufficient charging current and charges the electric storage device in a short period of time. Therefore, even when the engine stalls for some reason shortly after engine starting, the starter dynamo can be driven immediately thereafter by the stored electric power of the charged electric storage device, thus enabling restarting of the engine.

More specifically, though the starter dynamo requires a large current supply in a short period of time upon starting the engine, such an electric power is supplied by the electric storage device used exclusively for the starter dynamo. After engine starting, the starter dynamo, which generates a large electric power, charges the electric storage device within a very short period of time. Thus, in the case of restarting the engine after the engine stalls for some reason immediately following engine starting, the starter dynamo can be driven in a short period of time. In addition, since the storage battery is used to supply an electric power only to vehicle electric loads other than the starter dynamo, which requires the large electric power, the storage battery need not repeat charging and discharging in large electric power and the battery life can be prolonged.

The vehicle electric loads other than the starter dynamo is supplied with the electric power from the battery, and the battery is charged only by a vehicle alternating current generator. Thus, the electric power stored in the electric storage device for driving the starter dynamo will not be lost, which allows early restarting of the engine.

Preferably, after the engine is driven and engine combustion starts, the electric storage device is charged by the starter dynamo within 5 times the amount of time in which the starter dynamo required to drive the engine. Thus, the electric storage device is charged by the starter dynamo in a short period of time, enabling the next engine starting easily.

Preferably, charging is stopped when the electric charge of the electric storage device reaches a predetermined amount. Thus, the starter dynamo will not generate excessive electric power, and, even when the power generation voltage of the starter dynamo decreases, the electric storage device will not discharge its power to the starter dynamo.

Preferably, at the time of high speed rotation of the engine, both the power generation voltage of the starter dynamo and the power storage voltage of the electric storage device are prevented from rising excessively, and the electric storage device is prevented from discharging again to the starter dynamo.

Preferably, the starter dynamo is connected to the storage battery through a battery connecting switch. Even in the case that the electric storage device discharges greatly because the engine stops, the battery is connected directly to the starter dynamo to drive the starter dynamo thereby. Thus, insufficient electric power storage in the electric storage device will not prevent starting.

BRIEF DESCRIPTION OF THE DRAWINGS

Other objects, features and advantages of the present invention will be made more apparent by the following description when read in conjunction with the accompanying drawings, in which.

DETAILED DESCRIPTION OF THE PREFERRED EMBODIMENTS

[FIRST EMBODIMENT]

Figure 1:
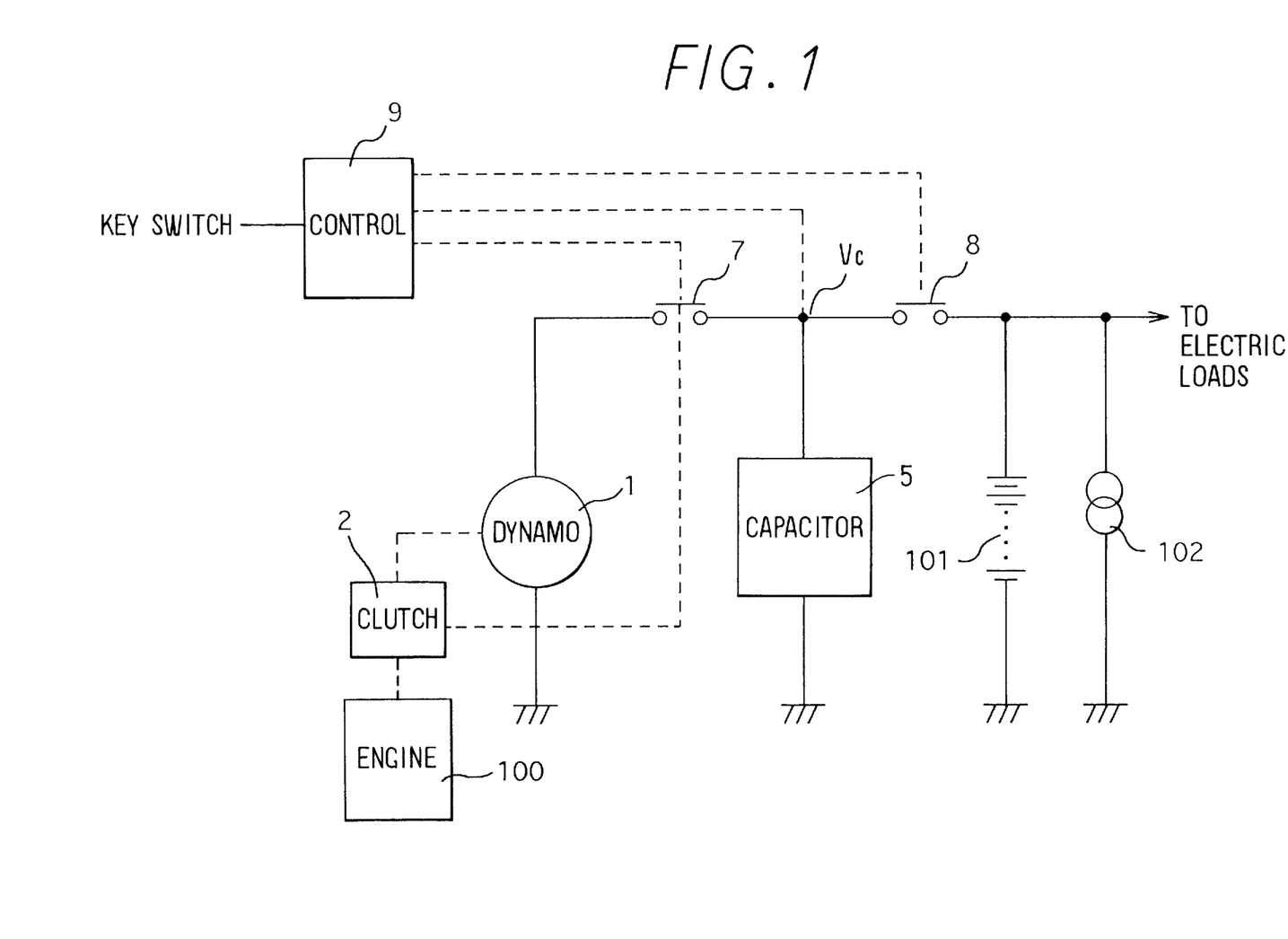
FIG. 1 is an electric circuit diagram showing an first embodiment of a vehicle electric power system according to the present invention.

In a vehicle electric power system shown in FIG. 1, a starter dynamo 1 is constructed as a direct current generator motor and engageable with an engine 100 through a clutch 2, with its high potential terminal being connected to a high potential terminal of an electric double-layered capacitor 5 (electric storage device) through a magnet switch 7 and its low potential terminal being grounded to a vehicle chassis. The high potential terminal of the electric double-layered capacitor 5 is connected through a relay 8, which is a battery connecting switch, to high potential terminals of a storage battery 101 and a vehicle alternating current generator (alternator) 102, low potential terminals of which are grounded to the vehicle chassis. A controller 9 is connected to control the magnet switch 7 and the relay 8 based on a voltage at the high potential terminal of the electric double-layered capacitor 5, i.e., an electric storage voltage Vc, and an input signal from a key switch (not shown in the Figure). The clutch 2 is an engaging mechanism between a pinion 35 and gear teeth of a ring gear 111.

Figure 2:
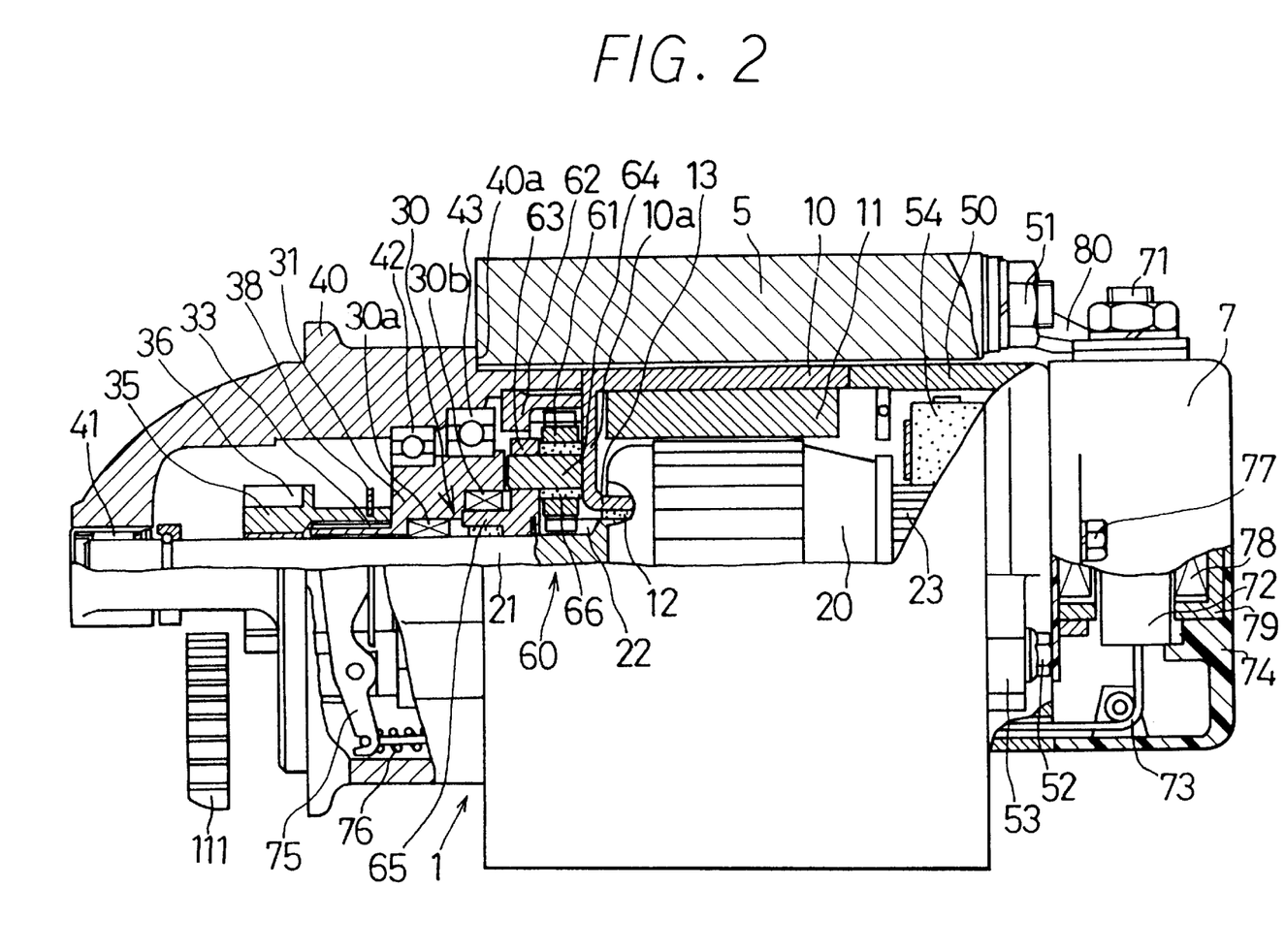
FIG. 2 is a partially cross-sectional view of a starter dynamo shown in FIG. 1.

As shown in FIG. 2, the starter dynamo 1 has a generally cylindrically-shaped housing 40 fixed to an engine block via a bolt (not shown). The housing 40 houses therein a planetary speed reduction mechanism 60, a pinion 35 and a one-way clutch mechanism 30. The one-way clutch mechanism 30 has a pair of one-way clutches 30a and 30b. The one-way clutch 30b restrains a relative rotation between an output shaft 65 and a clutch outer member 31 only when a rotation of an armature 20 is to be transmitted to the ring gear 111, while the one-way clutch 30a restrains a relative rotation between the clutch outer member 31 and a rotary shaft 21 only when a rotation of the ring gear 111 is to be transmitted to the armature 20.

A direct current rotary machine is fixed at the rear side of the housing 40. This direct current machine has a generally cylindrically-shaped yoke 10, both axial ends of which are open, and an end frame 50 fitted to the rear side of the yoke 10. The end frame 50, sandwiching the yoke 10 and the electric double-layered capacitor 5, is fastened to the housing 40 via through bolts 52. The electric double-layered capacitor 5 is shaped in a cylindrical form, which surrounds the outer circumferential surface of the yoke 10, and is sandwiched in a pressed manner between a stepped face 40a of the housing 40 and projections 53 extending radially outwardly from the end frame 50.

Even numbers of permanent magnets (field pole) are fixed to the inside surface of the yoke 10 and arranged in a circumferential direction to alternate in magnetic polarity. The armature 20 is fixed to the rotary shaft 21 at a radial inside of the permanent magnets 11. The rear end of the rotary shaft 21 is supported by the end frame 50 via a bearing (not shown), while the front end of the same is supported by the housing 40 via a bearing 41. The yoke 10 is made of soft iron and is formed with a ring-shaped partition plate 10a at the front end portion thereof. A bearing cylinder 13 extends toward the armature 20 from the radially inner circumference of the partition plate 10a. The bearing cylinder 13 supports the rotary shaft 21 via a bearing 12. A cylindrically-shaped commutator 23 and brushes 54 are housed within the end frame 50.

A magnet switch 7 includes a coil 78, a core 79, a plunger 72 and a plurality of switch contacts (not shown). Its outer circumference is covered by a resin cover 74 which is fixed to the end frame 50 via screws 77. A terminal 71 and a switch terminal (not shown) extends outwardly from a part of the resin cover 74, and the terminal 71 is connected electrically to an output terminal 51 of the electric double-layered capacitor 5 via an electric lead wire 80.

A sun gear 22 is formed on a generally central portion of the output shaft 21 and engaged with planetary gears 61 which are in engagement with a generally cylindrically-shaped internal gear 62 surrounding the radially outer periphery of the planetary gears 61. The internal gear 62 are fixed to the radially inner surface of the housing 40. The planetary gears 61 are fitted rotatably on pins 64 through corresponding bearings 66, and the pins 64 are press-fitted into the flange portion of a flanged cylindrical carrier 63. The carrier 63 is located forwardly of and adjacently to the sun gear 22 and fitted rotatably onto the rotary shaft 21.

The carrier 63 has a cylindrical portion (output shaft) 65 which extends toward the pinion 35 to form a clutch inner member of the one-way clutch 30b, and is supported rotatably on the rotary shaft 21 via a bearing. The one-way clutch 30b has a clutch outer member 31 fitted rotatably and is engaged for torque transmission from the cylindrical portion 65 to the clutch outer member 31 (engine driving direction). The one-way clutch 30a is provided between the clutch outer member 31 and the rotary shaft 21 to transmit a torque from the clutch outer member 31 to the rotary shaft 21. Since the constructions of one-way clutches 30a and 30b are known well in the art, the description thereof is omitted for brevity. The radially outer peripheral surface of the outer clutch member 31 is supported rotatably on the radially inner peripheral surface via bearings 42 and 43.

The pinion 35 is located forwardly of the clutch outer member 31 and is fitted on the rotary shaft 21 relatively rotatably and axially slidably. The rear portion of the pinion 35 engages the front portion of the clutch outer member 31 through a spline 33. The yoke 10 has the ring plate portion 10a extending radially inwardly from the end portion at the pinion side, and the cylindrical portion 13 extending rearwardly from the radially inner circumference of the ring plate portion 10a. The cylindrical portion 13 supports the rotary shaft 21 through a bearing 12. The pinion 35 has a gear portion 36 for engagement with the ring gear 111. A washer 38 is fitted onto the rear outer circumference of the pinion 35 to receive a force of a lever 75 which turns to engage the pinion 35 with the ring gear 111 in response to an operation of the switch 70 cooperatively with a wire 73.

Engine Starting Operation

When a key switch is turned on, a controller 9 turns on the magnet switch 7 in response to a key switch signal. The coil 78 of the magnet switch 7 is energized to attract the plunger 72 by a magnetic force, thereby closing electrical contacts (not shown). The lever 75 moves the pinion 35 so that its gear portion 36 engages the ring gear 111. The electric double-layered capacitor 5 supplies the electric power to the starter dynamo 1 through the lead wire 80 to cause the armature 20 to rotate. This rotating force is transmitted to the planetary speed reduction mechanism 60 through the sun gear 22 and then, with reduction in rotation speed and increase in torque, to the pinion 35 from the output shaft 65 of the carrier 63 through the one-way clutch 30b. This large rotating force is transmitted to the engine through the ring gear 111 to crank the engine. At this time, since the rotational speed of the pinion 35 is lower than that of the armature 20 which is before the speed reduction, the other one-way clutch 30a is in an idling condition.

Post-ignition Operation

Figure 3:
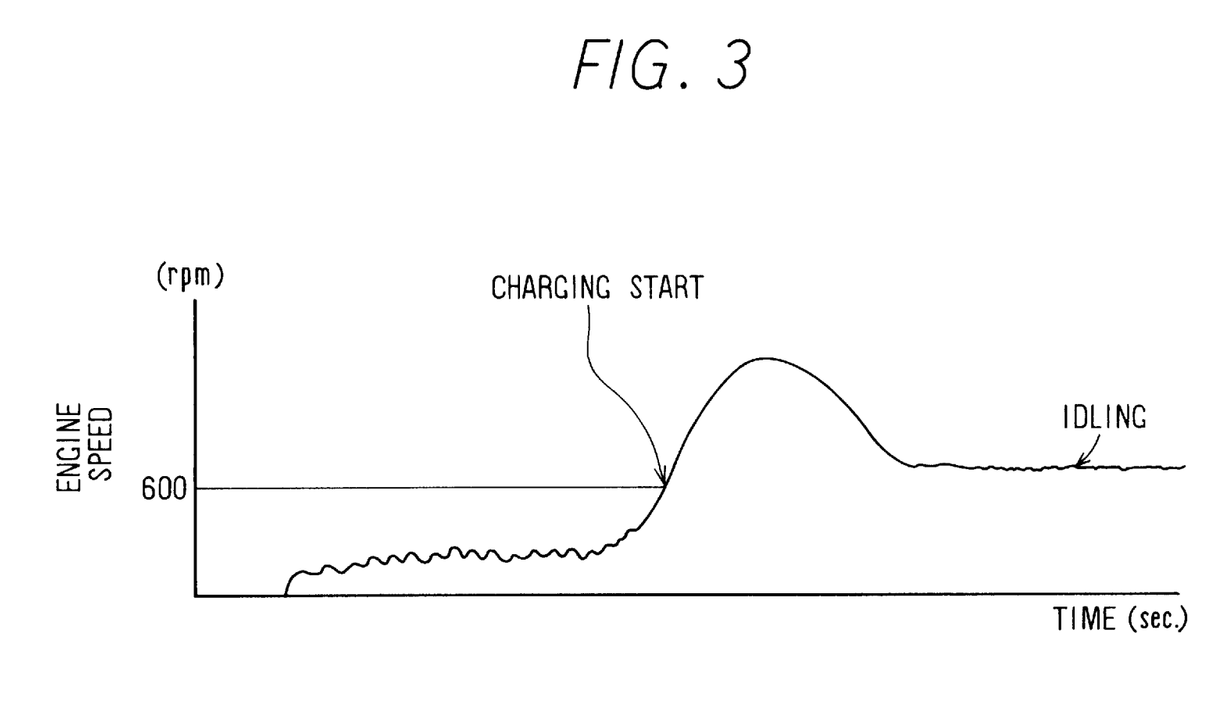
FIG. 3 is a time chart showing a charging start time point and a charging end time point during which an electric double-layered capacitor is charged by the starter dynamo.

When the engine rotational speed rises and the rotational speeds of the pinion 35 and the output shaft 21 equals to each other, the clutch 30a becomes disabled to idle and the both rotate integrally at a speed ratio of 1:1. As shown in FIG. 3, a chargeable power generation voltage is generated at a certain rotational speed (a speed, e.g., 600 rpm, slightly lower than an engine idling speed), and the electric double-layered capacitor 5 is charged thereby through the armature 20, commutator 23, brushes 54, magnet switch 7, terminal 71 and lead wire 80.

With the one-way clutch 30b being idling at this moment, the rotating force of the engine transmitted trough the pinion 35 is not transmitted to the carrier 63. Therefore, the rotational speed of the armature 20 is not increased by the planetary speed reduction mechanism 60 and, as a result, breakage of the armature 20 due to excessive rotation is prevented.

When the electric double-layered capacitor 5 is charged to the rated electric storage voltage (when its terminal voltage Vc exceeds a predetermined voltage), the controller 9 turns off the magnet switch 7. The plunger 72 returns to its initial position by a spring within the magnet switch 7, and the lever 75 returns to its initial position by the return spring 76 as well. The pinion 35 disengages from the ring gear 111, stopping the starter dynamo 1 and, hence, stopping power generation.

This starter dynamo 1 uses a permanent magnet type field magnetic pole which provides a fixed field magnetic flux. Therefore, the power generation voltage is in proportion to the rotational speed, and the resistance of the armature 20 under the low speed rotation at the time of assuring engine starting torque. Further, the electric lead wire 80 connecting the terminal 71 and the terminal of the electric double-layered capacitor 5 can be shortened sufficiently, and its cross-sectional area can be increased with only a negligibly small increase in material cost and weight. As a result, the electric power loss in the electric wiring at the time of power generation and engine starting can be reduced remarkably. In addition, the electric double-layered capacitor 5 has a small loss in its internal resistance at the time of charging and discharging by a large current. Thus, these advantages can provide a highly efficient apparatus synergistically.

According to this embodiment, the electric power charged and stored in the electric double-layered capacitor 5 drives the starter dynamo 1 to crank the engine 100. Therefore, the rated voltage of the electric double-layered capacitor 5 as well as that of the armature 20 of the starter dynamo 1 for the starting operation can be set arbitrarily without limitation by the battery voltage. With the voltage applied to the armature 20 being set higher than the rated voltage 12V of normal storage batteries 101, its electric supply current can be reduced to lower the power loss caused by the resistance of the electric wiring, thus providing, among other advantages, a reduction in the cross-sectional area of the armature coil.

For this reason, according to this embodiment, the rated maximum electric storage voltage of the electric double-layered capacitor 5 is set higher than the battery voltage, preferably at least 1.5 times fold higher. Thus, the apparatus will become more advantageous from the fact that the voltage of the electric double-layered capacitor 5 decreases in proportion to the square root of its discharging electric power and the self-discharging occurs in the electric double-layered capacitor 5.

Next, description is made with reference to the case where the electric double-layered capacitor 5 discharges excessively. In this case, the relay 8 is turned on to charge the electric double-layered capacitor 5 by the battery 101. It may occur, however, that the electric double-layered capacitor 5 cannot supply the starter dynamo 1 with a sufficient electric power required for starting the engine 100, because the electric storage voltage of the electric double-layered capacitor 5 is limited to the voltage of the battery 101 and the terminal voltage of the electric double-layered capacitor 5 decreases due to its discharging at the starting time. It will be preferred to counter this disadvantage that, if the voltage of the electric double-layered capacitor 5 which is normally charged to a higher voltage than the rated voltage of the battery 101 is low, the starter dynamo 1 is supplied with a starting electric power by both the electric double-layered capacitor 5 and the battery 101 by closing the relay 8 at the time of discharging to the starter dynamo 1 through the magnet switch 7.

Figure 4:
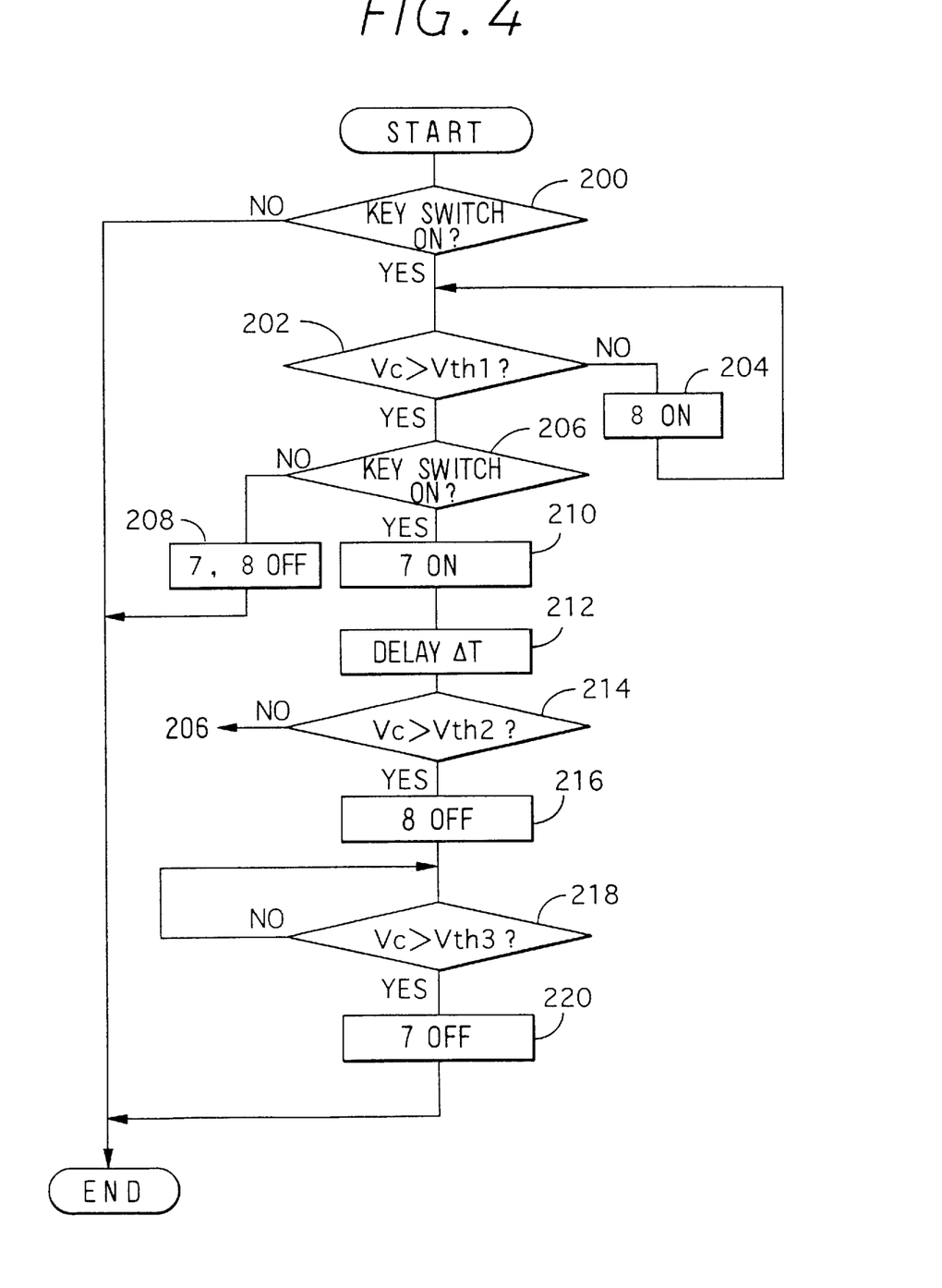
FIG. 4 is a flow chart showing an operation of a controller shown in FIG.1.

An example of the above-described control operation of the controller 9 is described next with reference to the flow chart of FIG. 4.

With the key switch being turned on (200), that is, when the key switch is turned to an engine starting command position, it is determined (202) whether the terminal voltage Vc of the electric double-layered capacitor 5 is higher than a threshold voltage Vth1. Immediately thereafter, if higher, or after turning on (204) the relay 8 and waiting until Vc rises above Vth1 if not higher, it is determined again (206) whether the key switch is still kept turned on. If the key switch is not kept turned on both the magnet switch 7 and the relay 8 are turned off (208) for return to the step 200; but if the key switch is kept turned on the magnet switch 7 is turned on (210).

It is to be understood that the threshold voltage Vth1 is an electric storage voltage value of the terminal voltage Vc with which the starter dynamo 1 can be driven solely by the electric double-layered capacitor 5. With this voltage, not only a starting current is supplied to the starter dynamo 1 from the electric double-layered capacitor 5, but also the pinion 35 is engaged with the ring gear 111 by an operation of the lever 75 for starting the engine 100. The relay 8 may be a unidirectional switch, such as a bipolar transistor or a thyristor, which enables only charging from the battery 101 to the electric double-layered capacitor 5.

At the following step, after a predetermined short time interval $\Delta T$ (212), it is determined (214) whether the terminal voltage Vc of the electric double-layered capacitor 5 is in excess of a threshold voltage Vth2. If in excess, after turning off the relay 8, it is determined (218) whether the terminal voltage Vc of the electric double-layered capacitor 5 is in excess of a threshold voltage Vth3. With the excess voltage, regarding that the electric double-layered capacitor 5 is charged with the sufficient electric charge required for the next starting operation, the magnet switch 7 is turned off (206) for returning to the step 200.

The threshold voltage Vth2 is set to a value of the terminal voltage Vc of the electric double-layered capacitor 5 existing at the engine cranking condition, i.e., successful starting condition (about 600 rpm in this embodiment) and is the terminal voltage Vc during the time in which the starter dynamo 1 is supplied with the starting current from the electric double-layered capacitor 5 and the battery 101 after completing the cranking operation. Since the starting current will decrease when the engine 100 is successfully started, the terminal voltage Vc will become higher than before, during which the starting current is kept supplied.

If, on the contrary, the step 214 determines that the terminal voltage Vc of the electric double-layered capacitor 5 is not in excess of the threshold voltage Vth2, it returns to the step 206 so that the starting current supply is continued as long as the key switch is kept turned on. If the terminal voltage Vc of the electric double-layered capacitor 5 is not in excess of the threshold voltage Vth3, the electric double-layered capacitor 5 is kept charged to a higher voltage at the step 218 until it rises above the threshold voltage Vth3.

In the present embodiment, the threshold voltages Vth1, Vth2 and Vth3 are set to 11V, 10V and 20V, respectively.

According to the present embodiment, the starter dynamo 1 has the pinion 35 for engagement with the ring gear 111 of the engine 100 and the armature 20 for rotation of the pinion 35. At the time of engine starting, the electric power stored in the electric double-layered capacitor 5, provided exclusively for the starter dynamo, is supplied to rotate the armature 20, which in turn rotates the pinion 35. The ring gear 111 of the engine 100 is driven through the pinion 35 and the engine 100 is started. After engine starting, rotation of the ring gear 111 is transmitted to the armature 20 through the pinion 35. The starter dynamo 1 thus charges the electric double-layered capacitor 5 so that the electric power required for the next engine starting is charged. That is, the starter dynamo 1 performs starting the engine and charging the electric double-layered capacitor 5. In proportion to the speed reduction ratio, e.g. 10, between the pinion 35 and the ring gear 111, the armature rotation speed becomes high to assure a sufficient charging current and charges the electric double-layered capacitor 5 in a short period of time. Therefore, even when the engine 100 stalls for some reason shortly after the engine starting, the starter dynamo 1 can be driven immediately thereafter by the stored electric power of the charged electric double-layered capacitor 5, thus enabling restarting of the engine.

More specifically, though the starter dynamo 1 requires a large current supply in a short period of time upon starting the engine 100, such an electric power is supplied by the electric double-layered capacitor 5 exclusively for the starter dynamo. After engine starting, the starter dynamo 1, which generates a large electric power, charges the electric double-layered capacitor 5 within a very short period of time. Thus, in the case of restarting the engine 100 after the engine stalls for some reason immediately following the engine starting, the starter dynamo 1 can be driven in a short period of time. In addition, since the storage battery 101 is used to supply the electric power only to the vehicle electric loads other than the starter dynamo 1, which requires the large electric power, the vehicle electric loads can be supplied with a sufficient electric power and the life of the battery 100 can be prolonged.

The vehicle electric loads other than the starter dynamo 1 is supplied with the electric power from the battery 101, and the battery 101 is charged only by the vehicle alternating current generator 102. Thus, the electric power stored in the electric double-layered capacitor 5 for driving the starter dynamo 1 will not be lost, which enables early restarting of the engine 100.

Further, since the internal impedances of the electric double-layered capacitor 5 and the starter dynamo 1 are low, charging and discharging are enabled highly efficiently and at high speeds in both discharging and charging operations, thus eliminating the necessity of driving the starter dynamo 1 for a long time. Thus, the starter dynamo 1 can be designed in the short-time and voltage-rating specifications similarly as the conventional starter. The changes in the design specifications of the starter can be reduced to a minimum or the conventional design specifications can be maintained, including the use of the conventional charging and discharging cable. To be more specific about the high efficiency, an electric circuit is enabled to drive the electric load highly efficiently on condition that the internal impedances of its power supply source and its load matches each other. It is very preferable to charge a low-impedance load, such as the electric double-layered capacitor 5, by a low-impedance device such as the starter dynamo 1. Since the starter dynamo requires to be driven by a large current for generating a large starting torque, it is generally designed as a direct current motor and, more preferably, as a series winding-type direct current motor.

In the case of the electric storage device which uses the electric double-layered capacitor therefor, a discharging operation is analyzed, in which the capacitor of 12V, 200F and 30 m$\Omega$ (internal resistance) discharges from its fully-charged condition to the starter at an average current of 150A for two seconds and the terminal voltage of the capacitor is reduced finally to 6V (current supply time) and 10.5V (open time). With the discharging electric charge $\Delta Q$ being 300[C], the following equation holds, wherein Q0, $\Delta Q$, I, Rc and C denotes an initial charge amount of the electric double-layered capacitor, a discharge amount, a discharge current, an internal resistance of the electric double-layered capacitor, and a capacitance of the electric double-layered capacitor, respectively.

$$\begin{aligned} V &= (Q0 - \Delta Q)/C - I \cdot Rc \quad \text{[Equation 1]} \\ &= (2400 - 300)/200 - 150 \cdot 0.03 \\ &= 6V \end{aligned}$$

Next, discharging of the electric double-layered capacitor 5 is discussed, assuming that a sum of the resistance of the electric wiring and the internal resistance of the generator is 20 $\Omega$Q. The electric charge Q charged with 14V (power generation voltage of the conventional vehicle generator) by the starter dynamo 1 is expressed by the following equation, wherein Vc and Rs denote a voltage across the electric double-layered capacitor and a sum of the resistance of the electric wiring and the internal resistance of the generator.

$$\begin{aligned} Q &= C \cdot Vc \cdot \{1 - \exp[-t/((C \cdot (Rs + Rc))]\} \quad \text{[Equation 2]} \\ &= 200 \cdot (14 - 10.5) \cdot \{1 - \exp[-t/((200 \cdot (0.02 + 0.03))]\} \end{aligned}$$

A time period t required for the charging may be derived from those Equations by replacing the charge amount Q by the initial discharge amount $\Delta Q$, and it results in 5.6 seconds, which means that the electric charge consumed at the time of starting operation can be stored in a very short period of time.

It is thus proved that the electric double-layered capacitor 5 can be charged in the short period of time as long as the internal resistance of the generator is low. That is, it is only required to continue for a short period of time the operation of the starter dynamo 1 after the engine starting operation. Although this required charging time period varies with the operation time period and the power supply current of the starter dynamo 1, the charging for the next engine starting may be completed at least within the 5 times time interval of the operation time period of the starter dynamo 1.

Further, according to the above-described construction, it will not occur that the battery 101 will discharge and waste the electric power due to self-discharging of the electric double-layered capacitor 5, since the battery 101 connecting to the vehicle electric loads and the electric double-layered capacitor 5 which is used as a power source for driving the starter dynamo 1 can be kept disconnected.

Further due to the construction that the magnet switch 7 disconnects the electric double-layered capacitor 5 and the starter dynamo 1 from each other except for the time of starting the engine and charging the electric double-layered capacitor 5, the electric double-layered capacitor 5 will not discharge its electric storage power even when the starter dynamo 1 stops power generating operation during that time period. Similarly, the electric double-layered capacitor 5 will not discharge even when the engine stops.

In addition, with the magnet switch 7 being closed by the controller 7, the electric storage power can be supplied to the starter motor 1 at the time of driving the starter dynamo 1, and the electric double-layered capacitor 5 can be charged easily with the electric power generated by starter dynamo 1.

With the magnet switch 7 being turned off by the controller 9 when the amount of charge of the electric double-layered capacitor 5 reaches a predetermined amount, the starter dynamo 1 will not generate the electric power unnecessarily. Even when the generated power voltage of the starter dynamo 1 falls thereafter, the electric double-layered capacitor 5 will not discharge to the starter dynamo 1.

Due to the construction that the controller 9 turns off the magnet switch 7, which in turn disengages the clutch 2, the starter dynamo 1 can be designed to have a power generating function while maintaining the short-time rated specification, thus resulting in a compact and highly efficient starter dynamo 1. Further, after the disengagement of the clutch 2, it will not occur that the electric double-layered capacitor 5 continues to discharge to the starter dynamo 1, which in turn unnecessarily rotates idly resulting in the complete discharging of the electric double-layered capacitor 5.

Further, since the starter dynamo 1 is connected to the battery 101 through the relay, the starter dynamo can be driven with the battery 101 as the power source by connecting the battery 101 directly to the starter dynamo 1, even in the case that the electric double-layered capacitor 5 discharges excessively due to, for instance, a long stop of the engine. Therefore, incapability of engine starting due to the insufficiency in the electric storage amount of the electric double-layered capacitor 5 can be overcome.

Further, since the battery 101 and the starter dynamo 1 is connected by automatically closing the relay 8 at the time of insufficiency in the electric storage capacitor 5 of the electric double-layered capacitor 5, incapability of engine starting due to insufficiency in the electric storage amount of the electric double-layered capacitor 5 which is caused by such a long engine stop can be overcome without manual operation.

In addition, since the charging with a high voltage increases correspondingly the electric storage amount, the discharging to the starter dynamo 1 at the time of starting operation can be maintained even when the terminal voltage of the electric double-layered capacitor 5 decreases because of its discharging at the time of starting operation.

Since the electric double-layered capacitor 5 is disposed around the outer circumference of the yoke 10 of the starter dynamo 1 and closely thereto, its volume (capacity) can be assured effectively to assure as much as electric storage capacity. Further, even when integrated with the electric double-layered capacitor 5, an increase in length in the axial direction of the starter dynamo 1 can be reduced. It can be fixed with ease and work as a sound-proof and vibration suppressing member which shuts off vibrations and driving sounds of the starter dynamo 1.

Since the starter dynamo 1 is supplied with the electric power from the electric double-layered capacitor 5 which is superior in high discharging performance, power loss can be reduced. Since the battery 101 is not required for the high discharging performance, the life of the battery 100 can be prolonged.

Since the electric double-layered capacitor 5 and the starter dynamo 1 is assembled integrally, the electrical contacts of those can be connected with a very short electric lead wire by arranging those contacts closely to each other as shown in FIG. 2. The ohmic loss (copper loss) relative to the generally large starting current and the comparatively large charging current can be small, and the highly efficient current supply can be realized at the time of starting and the subsequent charging of the electric double-layered capacitor 5, thus improving the starting ability.

Further, the starter dynamo 1 and the electric double-layered capacitor 5 can be mounted together on the engine 100 after being assembled to each other, so that the processes of mounting on the engine within a limited space and of troublesome wiring can be simplified.

Although the starter dynamo 1 needs a large current in a short period of time for starting the engine 100, the electric double-layered capacitor 5 used exclusively for the starter dynamo supplies its electric storage power. The electric double-layered capacitor 5 is charged within a very short period of time by the starter dynamo 1 which generates a large electric power after the engine starting operation. Therefore, at the time of restarting the engine which has stalled for some reason immediately after the engine starting, the starter dynamo 1 can be driven immediately after the stop. The battery 101 is required only to supply the electric power to the vehicle electric loads other than the starter dynamo 1, which requires a large electric current, and it need not be repeatedly charged and discharged by a large current, resulting in a prolongation of life of the battery 101.

[SECOND EMBODIMENT]

Figure 5:
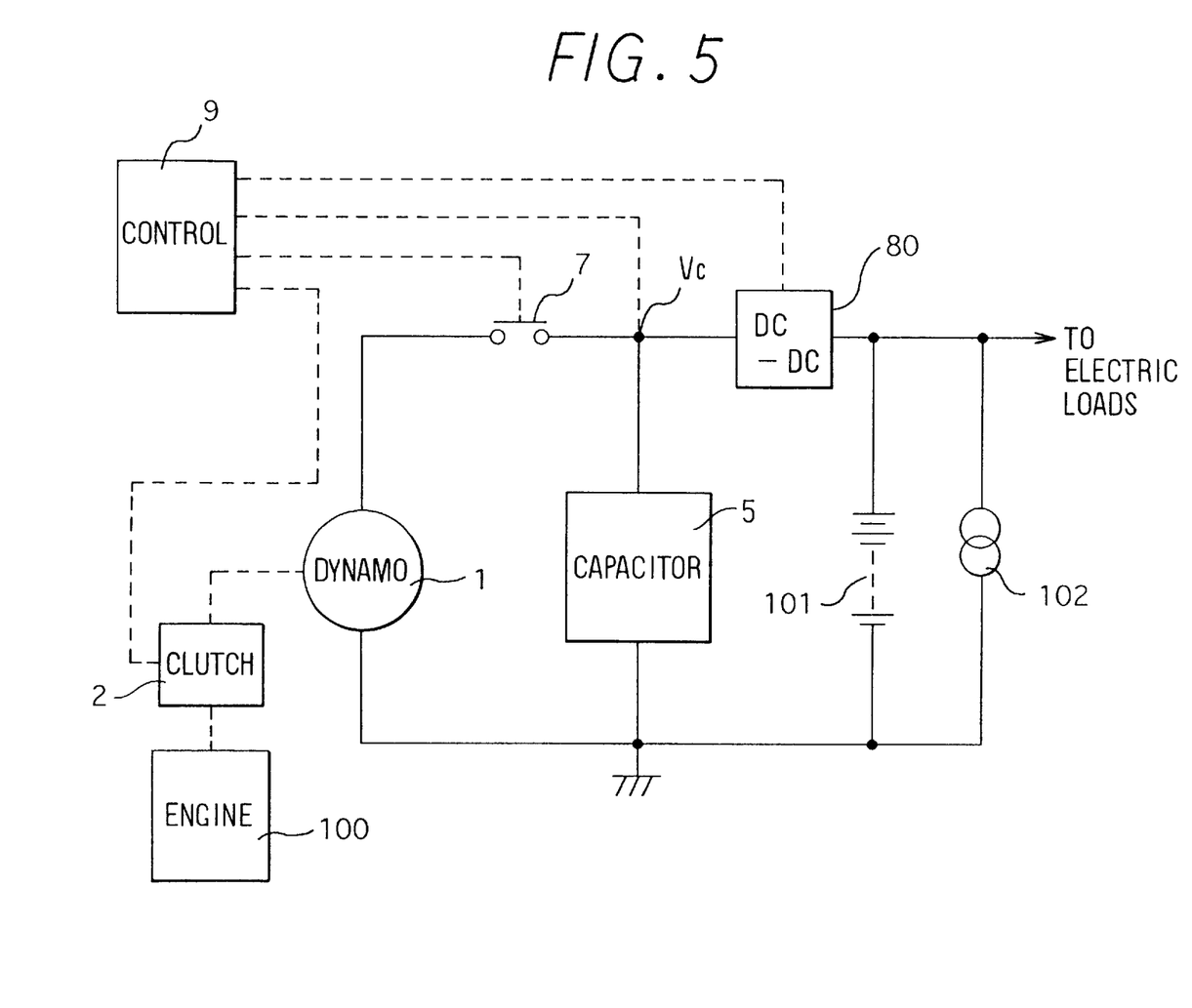
FIG. 5 is a circuit diagram showing a second embodiment of a vehicle electric power system according to the present invention.

In the embodiment shown in FIG. 5, the relay 8 is replaced by a voltage booster circuit 80 comprised of a DC—DC converter. Thus, the rated current of the starter dynamo 1 can be reduced and a further reduction in the power loss of the starter dynamo can be realized.

[THIRD EMBODIMENT]

Figure 6:
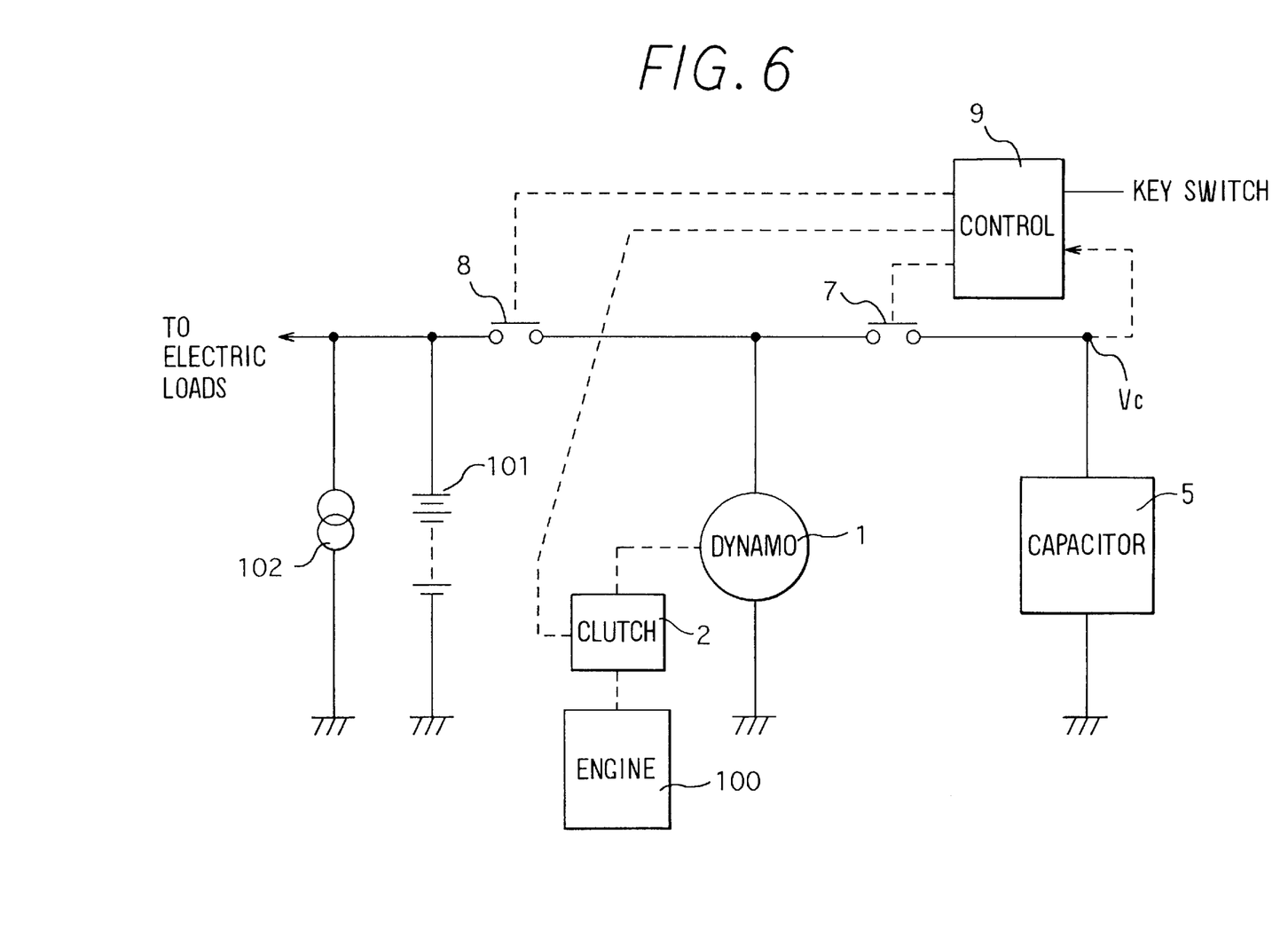
FIG. 6 is a partially cross-sectional view showing a third embodiment of a vehicle electric power system according to the present invention.

In the third embodiment shown in FIG. 6, the relay 8 is disposed at a position which connects the high potential terminals of the starter dynamo 1 and the battery 101.

This embodiment provides similar advantages. In this embodiment, however, since the starter dynamo 1 is supplied with the electric current without fail by the battery at the time of the closure of the relay 8, the starter dynamo 1 is driven solely by the battery 101 when the electric double-layered capacitor 5 cannot supply the terminal voltage Vc sufficiently. An example of this operation is explained with reference to a flow chart shown in FIG. 7.

Figure 7:
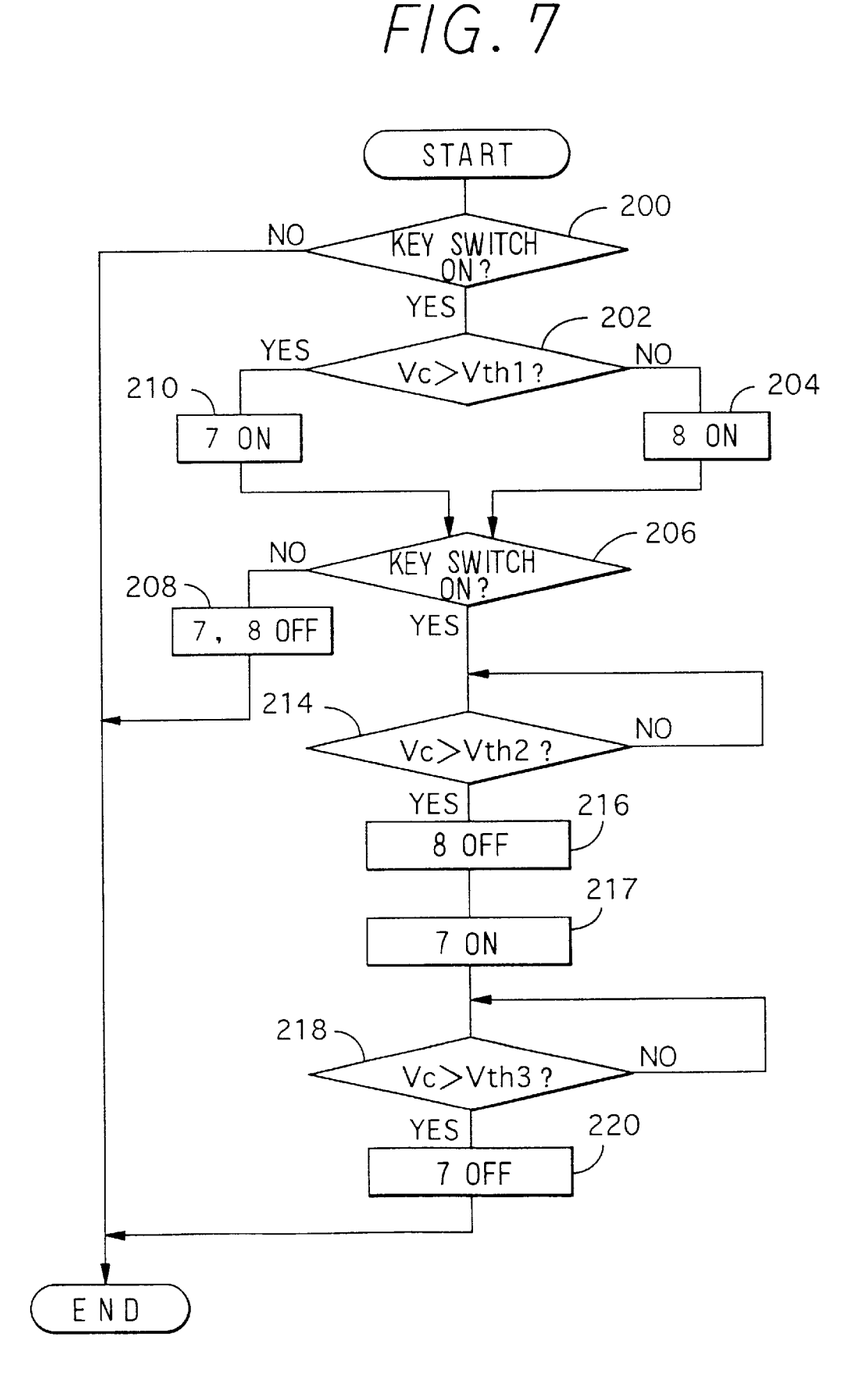
FIG. 7 is a flow chart showing an operation of the vehicle electric power system shown in FIG.6.

With the key switch being turned on (200), that is, when the key switch is turned to an engine starting command position, it is determined (202) whether the terminal voltage Vc of the electric double-layered capacitor 5 is higher than a threshold voltage Vth1. If higher, the magnet switch 7 is turned on, closed (210) to energize the starter dynamo 1 by the electric double-layered capacitor 5. If not, the relay 8 is turned on (204) to energize the starter dynamo 1 by the battery 101. Further, concurrently with the current supply to the starter dynamo 1 from the electric double-layered capacitor 5 or the battery 101, the controller 9 turns on the clutch 2 to engage the starter dynamo 1 with the engine 100. Thus, the pinion 35 engages the ring gear 111 to crank the engine 100. The relay 8 may be a unidirectional switch, for instance, a bipolar transistor, a thyristor or the like, which performs only charging the electric double-layered capacitor 5 from the battery 101. The threshold voltage Vth1 is set to an electric storage voltage value of the terminal voltage Vc with which the starter dynamo 1 can be driven solely by the electric double-layered capacitor 5. Thus, as long as the terminal voltage Vc of the electric double-layered capacitor 5 is sufficiently high, a starting electric power is supplied by the electric double-layered capacitor 5; but if not high enough, it is supplied by the battery 101.

Next, it is determined (206) again whether the key switch is still kept turned on. If the key switch is not turned on, the magnet switch 7 and the relay 8 are turned off to wait until the terminal voltage Vc of the electric double-layered capacitor 5 rises above the threshold voltage Vth2 (214).

The threshold voltage Vth2 is set to a value of the terminal voltage of the starter dynamo 1 existing at the time of engine cranking condition, i.e., successful starting condition (about 600 rpm in this embodiment). The successful engine cranking can be ascertained by detecting at the step 204 that the terminal voltage Vc exceeds the threshold voltage Vth2.

After ascertaining the successful engine cranking at the step 214, the relay 8 is turned off (216) and the magnet switch 7 is turned on (217). As a result, even in the case that the magnet switch 7 is not turned on at the step 210, the starter dynamo 1 can charge the electric double-layered capacitor 5 through the magnet switch 7 continuously when the engine 100 is successfully driven and enters the engine cranking condition. This charging continues until the terminal voltage Vc of the electric double-layered capacitor 5 reaches the threshold voltage Vth3 (218), so that the electric double-layered capacitor 5 is charged fully. When they terminal voltage Vc of the electric double-layered capacitor 5 exceeds Vth3, charging the electric double-layered capacitor 5 is completed and the magnet switch 7 is turned off (220).

In the present embodiment, as well as in the first embodiment, the threshold voltages Vth1, Vth2 and Vth3 are set to 11V, 10V and 20V, respectively.

[FOURTH EMBODIMENT]

Figure 8:
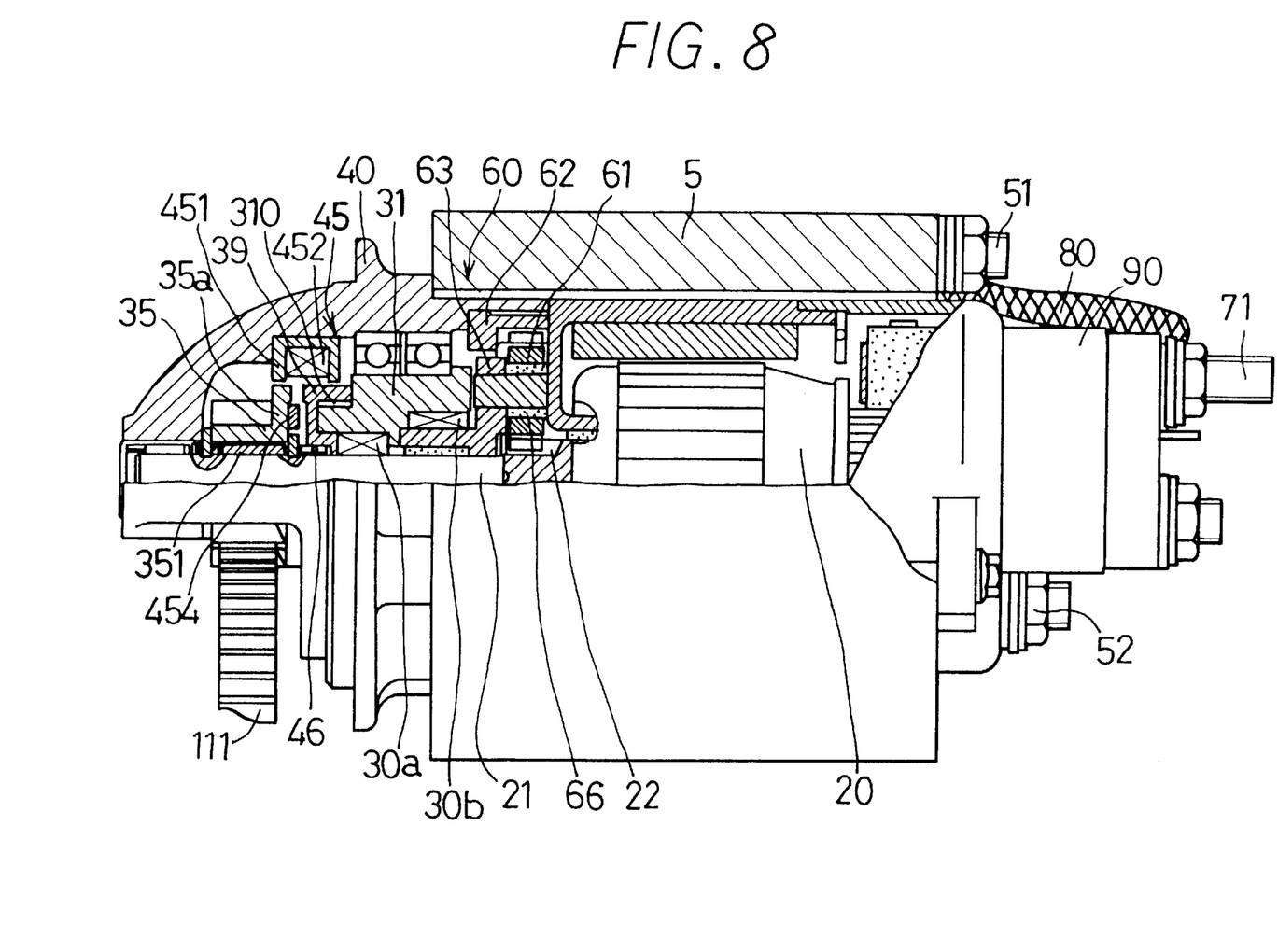
FIG. 8 is a partially cross-sectional view showing a fourth embodiment of a vehicle electric power system according to the present invention.

In the fourth embodiment shown in FIG. 8, the starter dynamo 1 of FIG. 2 is modified in that the pinion 35 is continuously engaged with the ring gear 111 and an electromagnet clutch 45 is disposed between the pinion 35 and the clutch outer member 31. In this embodiment, of course, the lever 75 of FIG. 2 is removed and a relay 90 turns on and off the current supply to the armature 20.

The pinion 35 fitted on the rotary shaft 21 through a bearing 351 relatively rotatably, but axially unmovably. A ring-shaped yoke 451 of the electromagnet switch 45 is disposed radially outside a rear end wall 35a of the pinion 35 and fitted into the inner circumferential surface of the front housing 40. Its cross-section perpendicular to the circumferential direction of the yoke 451 is in a cup shape opening radially inwardly to encase a coil 452 therein.

A spline 310 is formed on the outer circumference of the end of the clutch outer member 31 at the pinion side. The spline of the ring-shaped movable member 39 of the electromagnet clutch 45 is fitted on the spline 310 axially slidably, but relatively unrotatably. A return spring 46 biases the movable member 39 in a direction of disengagement of the electromagnet clutch 45, i.e., in a rearward direction. The movable member 39 forms a magnetic circuit of the electromagnet clutch 45 together with the yoke 451 and the rear end wall 35a. A clutch plate 454 is fixed to the rear end wall 35a.

According to this embodiment, when the key switch is turned on, the controller 9 causes the electric double-layered capacitor 5 to supply the electric current to the coil 452 of the electromagnet clutch 45 so that it attracts the movable member 39 magnetically toward the pinion 35 overcoming the force of spring 46. Thus, the movable member 39 is rendered integral with the pinion 35 for engagement of the starter dynamo 1 with the engine 100. The relay 90, turning on, energizes the armature 20 for starting, followed by the same subsequent operations as in the first embodiment. At the time when charging the electric double-layered capacitor 5 is completed, that is, its terminal voltage Vc rises above the threshold voltage Vth3, the current supply to the coil 452 is shut off and the electromagnet clutch 45 is disengaged to stop the rotation of armature 20.

[FIFTH EMBODIMENT]

Figure 9:
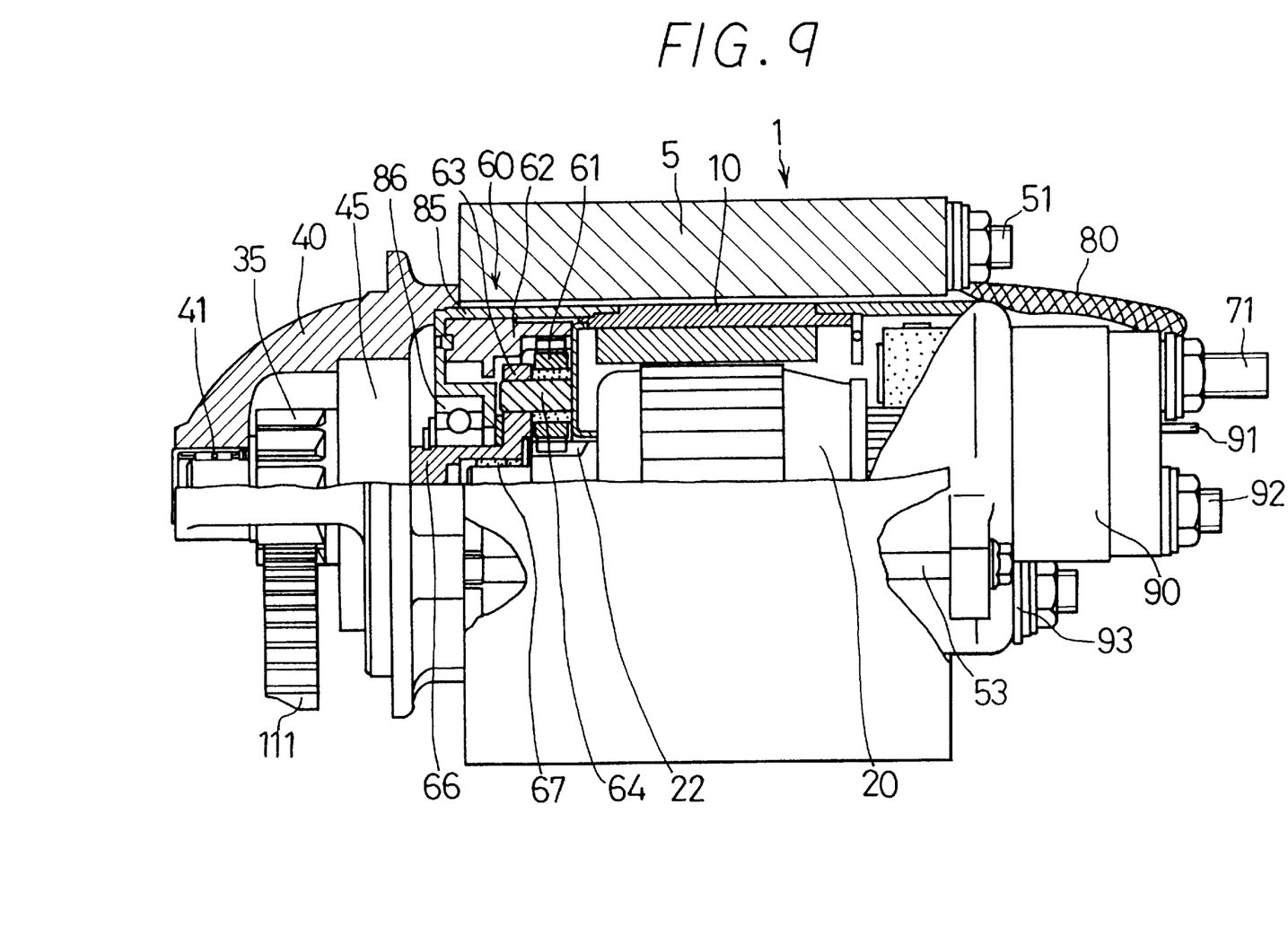
FIG. 9 is a partially cross-sectional view showing a fifth embodiment of a vehicle electric power system according to the present invention.

The embodiment shown in FIG. 9 is characterized by the use of an electromagnet clutch 45 which has a one-way clutch function.

More specifically, the output shaft 22 is formed short in length and its front end portion is relatively rotatably supported in the central concave portion of the carrier 63 through a bearing 67.

The carrier 63 has a speed reduction output shaft 66 extending forwardly, and the speed reduction output shaft 66 is supported rotatably by the center case 85 through the bearing 86. The center case 85 is sandwiched between the yoke 10 and the housing 40, and the internal housing 62 of the planetary speed reduction mechanism 60 is fitted with the inner circumferential face of the center case 85. The electromagnet clutch 45 connects the speed reduction output shaft 66 of the carrier 63 and the pinion 35 detachably.

Figure 10:
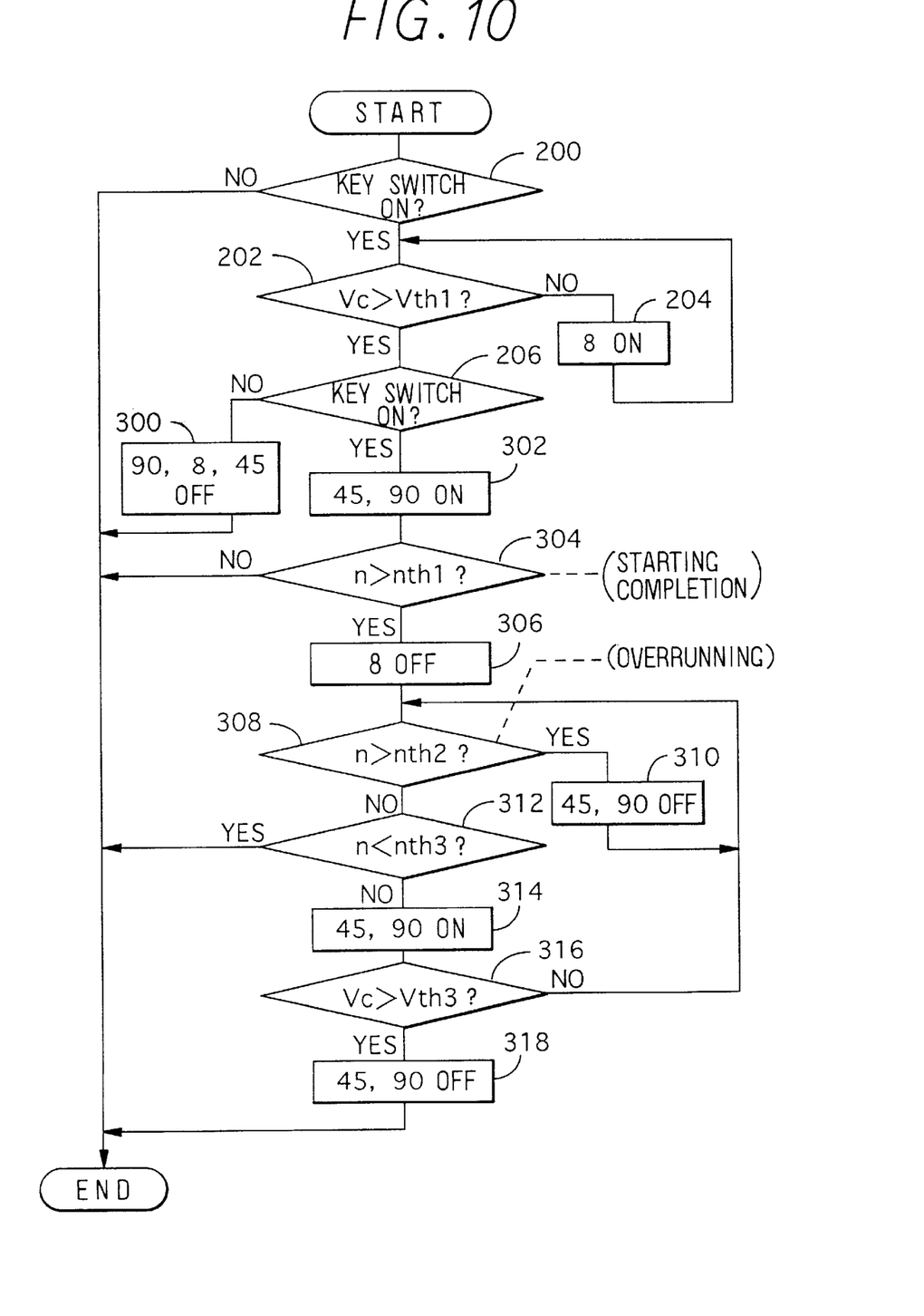
FIG. 10 is a flow chart showing an operation of the electric power system shown in FIG. 9.

An example of the above-described control operation of the controller 9 is explained with reference to the flow chart of FIG. 10.

With the key switch being turned on (200), that is, when the key switch is turned to an engine starting command position, it is determined (202) whether the terminal voltage Vc of the electric double-layered capacitor 5 is higher than a threshold voltage Vth1. Immediately thereafter if higher, or after turning on (204) the relay 8 and waiting until Vc rises above Vth1 if not higher, it is determined again (206) whether the key switch is still kept turned on. If the key switch is not kept turned on, both the relay 90 and the electromagnet clutch 45 are turned off (300) for return to the step 200; but if the key switch is kept turned on, the relay 90, which is a bilateral switch, and the electromagnet clutch 45 is turned on (302).

It is to be understood that the threshold voltage Vth1 is an electric storage voltage value of the terminal voltage Vc with which the starter dynamo 1 can be driven solely by the electric double-layered capacitor 5. With this voltage, not only the electric double-layered capacitor 5 supplies the starting current to the starter dynamo 1, but also the electromagnet clutch 45 connects the speed reduction output shaft 66 of the carrier 63 and the pinion 35, thereby to start the engine 100.

At the following step 304, it is determined (304) whether an engine rotational speed n, detected from an armature voltage or an engine rotational speed sensor output signal, is higher than a threshold rotational speed nth1 (cranking rotational speed is 600 rpm in this embodiment). If higher, determining that starting the engine 100 has been completed, the relay 8 is turned off (306) and a step 308 follows. If not higher, the process returns to the step 200. At the step 308, it is determined whether the engine rotational speed n is in excess of a threshold rotational speed nth2 (allowable maximum rotational speed is 1000 rpm of the planetary speed reduction mechanism 60 in this embodiment). If higher, the electromagnet clutch 45 is turned off (310) and a step 308 follows. If not higher, it is determined (312) whether the engine rotational speed n is lower than a threshold rotational speed nth3 (e.g., 400 rpm), that is, whether the engine rotational speed n has fallen below the engine rotational speed nth1 again. If it has fallen, the step 200 follows. If the engine rotational speed n is higher than the threshold rotational speed nth3, the electromagnet clutch 45 and the relay 90 are turned on (314). It is further determined (316) whether the terminal voltage Vc has reached the charge completion voltage Vth3 by charging. If charged, the electromagnet clutch 45 and the relay 90 are turned off (318) to return to the step 200. With the determination of step 316 being that the terminal voltage Vc is lower than the charging completion voltage Vth3, the process returns to step 308 to continue the charging operation.

In this embodiment, since the torque transmission from the engine 100 to the armature 20, as well as the torque transmission from the armature 20 to the engine 100, are performed via the planetary speed reduction mechanism 60, it is likely that the armature 20 rotates at an excessively high rotational speed. This disadvantage of excessively high speed rotation of the armature 20 is avoided by intermittent current supply to the electromagnet clutch 45. That is, since the electromagnet clutch 45 can perform the one-way clutch function as well in this embodiment, reduction in the number of component parts and improvement in assemblability can be realized.

[OTHER EMBODIMENTS]

Although in the first embodiment the controller determines whether the electric double-layered capacitor 5 is to be charged by comparing the terminal voltage Vc of the electric double layered capacitor 5 with the threshold voltage Vth3, the engine cranking operation, that is, successful starting operation, may be determined by way of detecting an engine rotational speed from frequencies of an engine rotation signal or an armature coil signal of the alternator 102. That is, the engine 100 and the starter dynamo 1 may be disconnected by the clutch 2 at the idling speed.

According to this control, the power generation voltage of the starter dynamo 1 and the electric storage voltage of the electric double-layered capacitor 5 will not rise excessively high at the time of high speed rotation of the engine 100, the electric double-layered capacitor 5 will not discharge again to the starter dynamo 1 either after the disengagement of the clutch 2.

In each above-described embodiment, the controller 9 may be replaced by other means, such as a combination of a key switch and a timer.

What is claimed is:

1. A starting and generating apparatus comprising:
   a battery electrically connected to a vehicular electric load;
   a vehicular generator driven by an engine for charging the battery;
   a starter dynamo having a pinion engageable with a ring gear of the engine and an armature for rotating the pinion, the armature being constructed to rotate the pinion for an engine starting and to be rotated after engine starting by a rotation of the ring gear transmitted through the pinion for generating an electric power; and
   electric storage means for supplying an electric power to the starter dynamo to drive the engine and for being charged by the starter dynamo after the engine starting.

2. A starting and generating apparatus according to claim 1, wherein:
   the electric storage means is charged by the starter dynamo after the engine is driven and ignited within a time interval that is 5 times a time interval that the starter dynamo requires for the engine starting.

3. A starting and generating apparatus according to claim 1, further comprising:
   switch means for electrically connecting the starter dynamo and the electric storage means to each other; and
   control means for controlling turning on and off of the switch means, the control means turning on the switch means at a time of operation of the starter dynamo to supply an electric storage power of the electric storage means to the starter dynamo and supplying after the engine starting a generated power of the starter dynamo to the electric storage means to charge the electric storage means.

4. A starting and generating apparatus according to claim 3, wherein:
   the control means turns off the switch means when a charge amount of the electric storage means reaches a predetermined amount.

5. A starting and generating apparatus according to claim 3, further comprising:
   clutch means provided between the starter dynamo and the engine; and
   the control means disengaging the starter dynamo and the engine by the clutch means as well as turning off the switch means.

6. A starting and generating apparatus according to claim 3, further comprising:
   clutch means provided between the starter dynamo and the engine; and
   the control means detecting a rotational speed of the engine and disengaging the starter dynamo and the engine by the clutch means when the detected rotational speed reaches a predetermined speed.

7. A starting and generating apparatus according to claim 1, further comprising:
   battery connecting switch means for connecting electrically the starter dynamo and the battery to each other.

8. A starting and generating apparatus according to claim 7, further comprising:
   switch means for electrically connecting the starter dynamo and the electric storage means to each other; and
   control means for controlling turning on and off of the switch means, the control means turning on the switch means and the battery connecting switch means at a time of operation of the starter dynamo to supply storage powers of the electric storage means and the battery to the starter dynamo when a charged amount of the electric storage means is below a predetermined amount and supplying after the engine starting a generated power of the starter dynamo to the electric storage means to charge the electric storage means.

9. A starting and generating apparatus according to claim 1, wherein:

the electric storage means is charged up to a voltage higher than a rated voltage of the battery.

10. A starting and generating apparatus according to claim 1, wherein:
the electric storage means is disposed closely to and around an outer circumference of a yoke of the starter dynamo.

11. A starting and generating apparatus according to claim 1, wherein:
the electric storage means includes an electric double-layered capacitor.

12. A starting and generating apparatus according to claim 1, wherein:
the electric storage means is disposed integrally with the starter dynamo.

13. A starting and generating apparatus comprising:

a starter dynamo having a pinion engageable with a ring gear of an engine and an armature for rotating the pinion, the armature being constructed to rotate the pinion for an engine starting and to be rotated after engine starting by a rotation of the ring gear transmitted through the pinion for generating an electric power; and electric storage means for supplying an electric power to the starter dynamo to drive the engine and for being charged by the starter dynamo after the engine starting, the electric storage means being disposed integrally with the starter dynamo.

* * * * *